United States Patent [19]

Chamard et al.

[11] 4,371,567
[45] Feb. 1, 1983

[54] HIGH COERCIVITY, COBALT-DOPED FERRIMAGNETIC IRON OXIDE PARTICULATES

[75] Inventors: Alex Chamard, La Courneuve; Patrick Dougier, Andresy; Jean-Bruno Monteil, Paris, all of France

[73] Assignee: Rhone-Poulenc Industries, Paris, France

[21] Appl. No.: 251,770

[22] Filed: Apr. 7, 1981

[30] Foreign Application Priority Data

Apr. 28, 1980 [FR] France ............... 80 09498

[51] Int. Cl.³ .................................. C01G 49/02
[52] U.S. Cl. ................................. 427/130; 427/127; 427/213; 252/62.56
[58] Field of Search ............................. 252/62.56; 427/127–130, 213

[56] References Cited

U.S. PATENT DOCUMENTS 4,224,175  9/1980  Montino et al. ............... 252/62.56
4,267,207  5/1981  Sasazawa et al. ............ 252/62.56 X
4,296,149  10/1981  Rudolf et al. ................ 252/62.56 X

FOREIGN PATENT DOCUMENTS 1437843  6/1976  United Kingdom ............. 252/62.56

*Primary Examiner*—Jack Cooper
*Attorney, Agent, or Firm*—Burns, Doane, Swecker & Mathis

[57] ABSTRACT

Highly coercive, cobalt-doped ferrimagnetic iron oxide particulates comprised of ferrous iron and well-adapted for the manufacture of various magnetic recording media, are prepared by (i) thermally decomposing a $\beta$-diketone/cobalt complex onto fluidized iron oxide particles having the formula $(FeO)_xFe_2O_3$, wherein $0 \leq x \leq 1.5$, (ii) next annealing the particulates which result at a temperature ranging from about 300° to 500° and then (iii) permitting the same to cool, while at the same time sweeping the cooling zone with an inert gas, and then (iv) controlledly re-oxidizing the annealed/cooled particles.

8 Claims, 1 Drawing Figure

HIGH COERCIVITY, COBALT-DOPED FERRIMAGNETIC IRON OXIDE PARTICULATES

BACKGROUND OF THE INVENTION

1. Field of the Invention

The present invention relates to magnetic particles of high coercivity, and, more especially, to such magnetic particles comprising ferrimagnetic iron oxides doped with cobalt, to processes for the preparation thereof and to various uses therefor.

2. Description of the Prior Art

Magnetic iron oxide particles doped with cobalt on the surfaces thereof have a higher coercivity than the conventional magnetic iron oxide particles, which do not contain cobalt. Such particles possess improved magnetic properties but typically are characterized by fairly high cobalt levels, and thus are quite expensive. And if the cobalt level of such particles is maintained fairly low, it is necessary to have the iron in the divalent state in order to preserve the magnetic properties; but the particles are then likely to lose these magnetic properties by oxidation of the ferrous iron.

Furthermore, various methods are known to this art for the preparation of magnetic iron oxide particles containing cobalt. Thus, Japanese Patent No. 48-44,040/1973 describes a process including the hydrothermal reaction of a magnetic iron oxide in an alkaline solution, in the presence of a transition metal salt.

Japanese Patent No. 50-85,612/1975 describes the preparation of a magnetic iron oxide by deposition of cobalt onto acicular iron oxide particles and then treatment of such particles with ferrous ions. Also, published French Patent Application No. 2,387,912 describes the preparation of a magnetic iron oxide by partial reduction in gaseous or liquid phase and then by deposition of cobalt onto the acicular iron oxide particles in an alkaline medium.

All of the aforesaid processes include the treatment, in the aqueous phase, of acicular iron oxide particles, $(FeO)_x \cdot Fe_2O_3$ (with $0 \leq x \leq 1.5$), with cobalt complexes which are obtained in an alkaline medium and which attach themselves to the surfaces of the particles. A treatment of this "wet method" type exhibits a very considerable number of disadvantages. In fact, it is difficult to disperse the iron oxides in solution; the deposits of cobalt or ferrous iron on the surfaces of the particles are not homogeneous; and a mixture of the various oxidation states of cobalt ($Co^{2+}, Co^{3+}$) may exist, or $Co(OH)^+$ complexes or inert $Co(OH)_2$ precipitates may be present, on the surfaces of said particles. Furthermore, it is difficult to fix the percentage of ferrous iron when the latter is added.

To overcome the majority of the disadvantages which are attendant a "wet method", German Pat. No. 2,242,500 has proposed to carry out comparable treatment of iron oxide particles by a "dry method". In accordance with this process, carbonyl compounds of cobalt and iron are deposited in the vapor phase, in a fluidized bed, onto acicular iron oxides. However, this process gives rise to pyrophoric products which are inconvenient in the application thereof.

SUMMARY OF THE INVENTION

Accordingly, a major object of the present invention is the provision of an improved process for the preparation of cobalt-doped iron oxide particles, which process exhibits, in particular, the numerous advantages of the "dry method" vis-a-vis the "wet method", and which results in oxide particulates well adapted for the manufacture of recording media for the magnetic storage of information. The high coercivity of the subject particles is moreover ensured by optimum proportions of cobalt and iron in the ferrous state.

Another object of the invention is the provision of improved magnetic particles of ferrimagnetic iron oxides, doped with cobalt on the surface thereof, which particulates possess excellent magnetic properties combined with exceptional heat stability and an exceptional resistance to loss of magnetic properties upon passage of time.

In the description which follows, $H_c$ represents the coercive field, $\sigma_r$ represents residual magnetization and $\sigma_s$ represents the saturation magnetization.

Briefly, the present invention features the preparation of ferrimagnetic iron oxide particles doped with cobalt and containing iron in the ferrous state, comprising, in a first step, thermally decomposing a β-diketone complex of cobalt in a fluidized bed, onto iron oxide particles of the formula $(FeO)_x \cdot Fe_2O_3$, in which $\leq x \leq 1.5$; next annealing the particulates which result and then permitting the same to cool, while at the same time sweeping the cooling zone with an inert gas; and, thirdly, controlledly re-oxidizing the annealed/cooled particles.

BRIEF DESCRIPTION OF THE DRAWING

The FIGURE of Drawing is a graphical representation of coercive field versus temperature according to the invention.

DETAILED DESCRIPTION OF THE INVENTION

Figure 1:
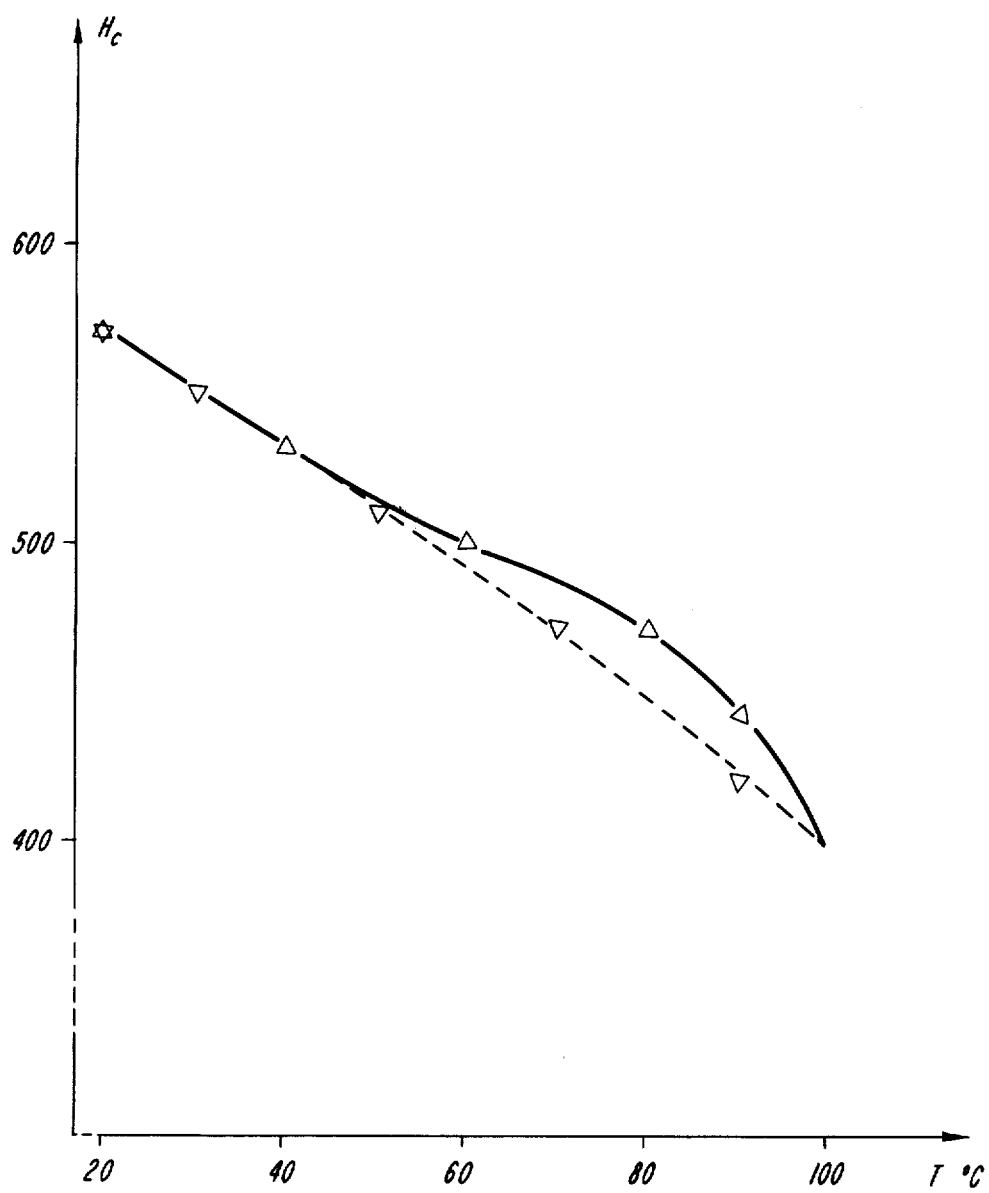

More particularly according to this invention, in said first step β-diketone complex of cobalt is thermally decomposed onto iron oxide particles of the formula $(FeO)_x \cdot Fe_2O_3$, in which $0 \leq x \leq 1.5$.

The β-diketone complexes of cobalt employed in the first step must be such that their decomposition point is between about 300° and 500° C. and such that their sublimation point is below their decomposition point. These complexes have the formula $Co(L)_n$, in which $n = 2$ or $3$ and L is represented by the formula

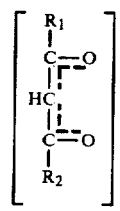

in which $R_1$ and $R_2$ are alkyl radicals preferably having from 1 to 5 carbon atoms.

Complexes which are preferred are cobalt(II) acetylacetonate of the formula $Co(A)_2$, in which A is represented by

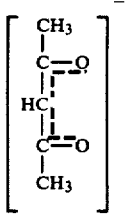

or the complexes Co(thd)₃ or Co(thd)₂, in which thd represents

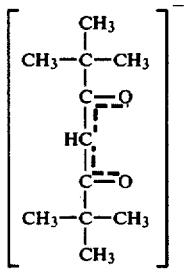

The iron oxide particles which are used have the formula $(FeO)_x Fe_2O_3$, in which $0 \leq x \leq 1.5$; same are conveniently obtained, for example, by the dehydration and then the reduction of acicular particles of iron oxide-hydroxide, FeOOH.

One of the advantages of the process of the invention is the option of preparing the iron oxide used in the same fluidized bed as that in which the decomposition reaction of the β-diketone complex is carried out, and hence to carry out these two operations successively and continuously.

The iron oxide particles are fluidized by means of a carrier gas, advantageously consisting of a mixture of nitrogen and hydrogen, at a flow rate which ensures fluidization. The cobalt complex is preferably introduced into the fluidization zone by subliming it in the carrier gas.

The temperature of the thermal decomposition typically ranges from about 300° to 500° C. The duration of the treatment of the powder depends on the percentage of cobalt desired to be deposited onto the particles.

According to the second step of the process of the invention, the particles obtained in the first step are annealed. The annealing temperature is preferably between 300° and 500° C. and the annealing operation is typically carried out for a period of time of between about 1 hour and 3 hours. The particles are then left to cool to ambient temperature, while sweeping the zone of cooling with an inert gas in order to remove, in particular, the organic compounds and the hydrogen which are present.

In the third step of the process of the invention, controllable re-oxidation of the resulting product is carried out. The purpose of this re-oxidation is to form a layer of cobalt ferrite on the surfaces of the particles. Without limiting the present invention to any particular theory, it is reasoned that the crystallization of this layer $[(Co_x{}^{2+}Fe_y{}^{2+})O_{x+y}]_z \cdot Fe_2O_3$ is very rapid because of the atomization of the cobalt onto the particles, this constituting an additional advantage of the process according to the invention.

The re-oxidation can be carried out with the aid of an air/inert gas mixture at a temperature between about 200° and 300° C.

The treatment time makes it possible to easily adjust or control the percentage of iron in the ferrous state, as desired; it is typically between 10 and 30 minutes.

The magnetic particles based on ferrimagnetic iron oxides and doped with cobalt, obtained in accordance with the process of the invention, are characterized by a spinel structure of the $\gamma\text{-}Fe_2O_3$ or $Fe_3O_4$ type, depending on the percentage of $Fe^{2+}$; the cobalt is present in the form of $Co^{2+}$ on the surface of the spinel structure.

The subject particles possess excellent static magnetic properties (coercivity $H_c$, $\sigma_r$, $\sigma_s$). In particular, the preferred magnetic particles of the invention, for video applications, typically contain from about 2.5 to 4% of cobalt and from about 6 to 16% of $Fe^{2+}$; for these proportions, the values of $H_c$, $\sigma_r$ and $\sigma_s$ are generally such that:

$600 < H_c < 640$ Oe $35 < \sigma_r < 38$ cgs emu/g $76 < \sigma_s < 81$ cgs emu/g $0.43 < (\sigma_r/\sigma_s) < 0.50$.

The preferred magnetic particles of the invention, for audio applications, typically contain from about 1 to 2.5% of cobalt and from about 5 to 16% of $Fe^{2+}$; for these proportions, the values of $H_c$, $\sigma_r$ and $\sigma_s$ are generally such that $530 < H_c < 570$ Oe $36 < \sigma_r < 37$ cgs emu/g $78 < \sigma_s < 85$ cgs emu/g $0.42 < (\sigma_r/\sigma_s) < 0.45$.

From these values, it is apparent that the particles according to the invention are especially valuable for magnetic recording in that they permit a most advantageous optimization of the levels of Co and $Fe^{2+}$.

Apart from these excellent magnetic properties, the particles of the invention possess exceptional heat stability and an exceptional resistance to loss of magnetic properties upon passage of time, which makes it possible to ensure and preserve a magnetic recording of very high quality.

Thus, the ferrimagnetic iron oxide particles of the invention, doped with cobalt, typically exhibit a relative loss in magnetic properties, which is represented by $(\Delta H_c/H_c)+(\Delta\sigma_r/\sigma_r)$, of less than 2%, after aging for 2 weeks at 90° C. Furthermore, such particulates typically possess a coercivity of more than 500 Oe after brief heating at 60° C. Moreover, the losses in coercivity which result after brief heating at a temperature of up to about 100° C. are reversible.

The exceptional resistance of the particles of the invention to loss in magnetic properties makes it possible to compare these particles with those doped with cobalt but which do not contain $Fe^{2+}$; the particles of the invention moreover possess static magnetic properties which are markedly superior to those of said non-$Fe^{2+}$ particulates.

The magnetic particles of the invention are useful, notably, in the manufacture of magnetic recording media, for example, for digital or analog recording on floppy discs, rigid discs, tapes for conventional tape recorders, and audio or video magnetic cassettes.

In order to further illustrate the present invention and the advantages thereof, the following specific examples are given, it being understood that same are intended only as illustrative and in nowise limitative.

EXAMPLE 1

25 g of an acicular $Fe_3O_4$ powder were placed in a fluidized bed heated to 400° C. This powder was fluidized by means of a carrier gas, consisting of a $N_2/H_2$ mixture containing 7% of hydrogen, at a flow rate of 100 liters/hours.

4.5 g of cobalt acetylacetonate vapor having the formula

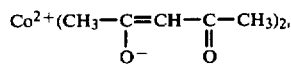

produced by sublimation at 175° C., for 2 hours, 30 minutes, from a source of 5 g of cobalt acetylacetonate, were introduced into the carrier gas.

The resulting powder was baked at 400° C. for 1 hour under a nitrogen atmosphere.

The powder was then permitted to cool in the fluidized bed, while sweeping the bed with nitrogen gas.

The powder thus obtained was finally subjected to oxidation with a $N_2$/air mixture containing 20% of air, in fluidized bed, at 250° C., for about 25 minutes. The characteristics of the resulting magnetic particles are reported in Table I below.

EXAMPLE 2

The procedure of the preceding example was followed, but a sublimation time of only 2 hours was used.

The characteristics of the resulting magnetic particles are also reported in Table I below.

EXAMPLE 3

The procedure of Example 1 was followed, but only 3.2 g of cobalt acetylacetonate were used at the beginning of the reaction.

The characteristics of the resulting magnetic particles are also reported in Table I.

EXAMPLE 4

The procedure of Example 3 was followed, but an oxidizing heat treatment of only 15 minutes was employed.

The characteristics of the resulting magnetic particles are also reported in Table I.

TABLE I

| Example No. | % of $Fe^{2+}$ | % of $Co^{2+}$ | $H_c$ | $\sigma_r$ | $\sigma_s$ | $\sigma_r/\sigma_s$ |
|---|---|---|---|---|---|---|
| 1 | 9.0 | 3.8 | 630 | 35 | 35 | 0.45 |
| 2 | 9.0 | 3.6 | 610 | 36 | 36 | 0.46 |
| 3 | 8.5 | 2.1 | 540 | 35.5 | 35.5 | 0.45 |
| 4 | 8.0 | 2.2 | 550 | 36 | 36 | 0.46 |

In this table, the percentages are expressed by weight, $H_c$ in Oersted and $\sigma_r$ and $\sigma_s$ in units of cgs emu/g.

EXAMPLE 5

This example illustrates the resistance of the particles obtained in Example 4 to thermal stresses and aging.

The relative loss in magnetic properties, which is represented by $$(\Delta H_c/H_c)+(\Delta\sigma_r/\sigma_r),$$

is equal to 1.5%, after particle aging for 2 weeks at 90° C.

After heating for 30 minutes at 60° C., the coercivity of the particles, measured at this temperature, was 510 Oe.

The variation in the coercive field of the particles as a function of the temperature is reflected in FIG. 1. It has been determined that the losses in coercive field are reversible, in particular, at temperatures between 20° and 100° C.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of high coercivity, cobalt-doped ferrimagnetic iron oxide particulates, said particulates comprising ferrous iron, and which process comprises (i) thermally decomposing a β-diketone complex of cobalt having a decomposition temperature in the range of 300° to 500° C., and a sublimation point therebelow, onto fluidized iron oxide particles having the formula $(FeO)_xFe_2O_3$, wherein $0<x<1.5$, (ii) next, in an inert atmosphere, annealing the particulates which result at a temperature ranging from about 300° to 500° C. and then (iii) permitting the same to cool, while at the same time sweeping the cooling zone with an inert gas, and thence (iv) controllably re-oxidizing the annealed, cooled particles to effect formation of cobalt ferrite thereon, the cobalt being present in the form of $Co^{+2}$.

2. The process as defined by claim 1, said β-diketone complex of cobalt having the formula, $Co(L)_n$, wherein n is 2 or 3, and L has the formula:

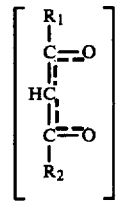

in which $R_1$ and $R_2$ are lower alkyl.

3. The process as defined by claim 2, said complex being cobalt acetylacetonate.

4. The process as defined by claim 2, said complex being $Co(thd)_3$ or $Co(thd)_2$.

5. The process as defined by claim 1, said iron oxide particles having the formula $(FeO)_xFe_2O_3$ having been prepared via dehydration and reduction of acicular particles of iron oxide-hydroxide.

6. The process as defined by claim 1, said iron oxide particles being fluidized in a carrier gas consisting of a mixture of nitrogen and hydrogen, and said cobalt complex being sublimed therein.

7. The process as defined by claim 1, wherein the controllable re-oxidation is effected with a mixture of air and inert gas at a temperature ranging from 200° to 300° C.

8. The process as defined by claim 1, the annealed particulates being cooled in step (iii) to ambient temperature.

* * * * *